United States Patent
Demers et al.

[11] 3,810,682
[45] May 14, 1974

[54] ANTI-LOCK BRAKE SYSTEM

[75] Inventors: Theodore E. Demers, Ann Arbor; Erkki A. Koivunen, Livonia, both of Mich.

[73] Assignee: General Motors Corporation, Detroit, Mich.

[22] Filed: Mar. 12, 1973

[21] Appl. No.: 339,619

[52] U.S. Cl............................ 303/21 F, 188/181 C
[51] Int. Cl............................................... B60t 8/06
[58] Field of Search.......... 303/21 F, 21 CF, 21 CG, 303/21 BB, 21 B, 61–63, 68–69; 188/181

[56] References Cited
UNITED STATES PATENTS

| | | | |
|---|---|---|---|
| 3,672,731 | 6/1972 | Koivuner | 303/21 F |
| 3,718,375 | 2/1973 | Bowler et al. | 303/21 F |

*Primary Examiner*—Duane A. Reger
*Assistant Examiner*—D. C. Butler
*Attorney, Agent, or Firm*—D. D. McGraw

[57] ABSTRACT

An anti-lock brake system utilizes automatic transmission governor pressure as the average rear wheel speed input signal. A check valve communicates fluid from the governor to an accumulator where it is stored. A flow control valve discharges fluid from the accumulator at a constant rate providing a pressure rate or change in the accumulator somewhat exceeding the pressure rate or change or the governor pressure during vehicle deceleration at the maximum achievable rate. The pressure differential resulting between the accumulator pressure and the wheel speed pressure from the governor during periods of excessive wheel deceleration operates a control valve which exhausts the support pressure from a conventional brake pressure modulator to release the brakes. A period of wheel acceleration follows the brake release and during the resulting wheel speed recovery, the accumulator is recharged and the control valve is shifted to reapply support pressure to the modulator. An acceleration sensing circuit is provided which senses the rapid wheel speed recovery subsequent to brake release on a high coefficient surface and reapplies support pressure to the modulator even before the control valve is restored to its normal position so as to hasten the application of the brakes and thereby compensate for the inherent time delay in cycling of the control valve and modulator.

3 Claims, 1 Drawing Figure

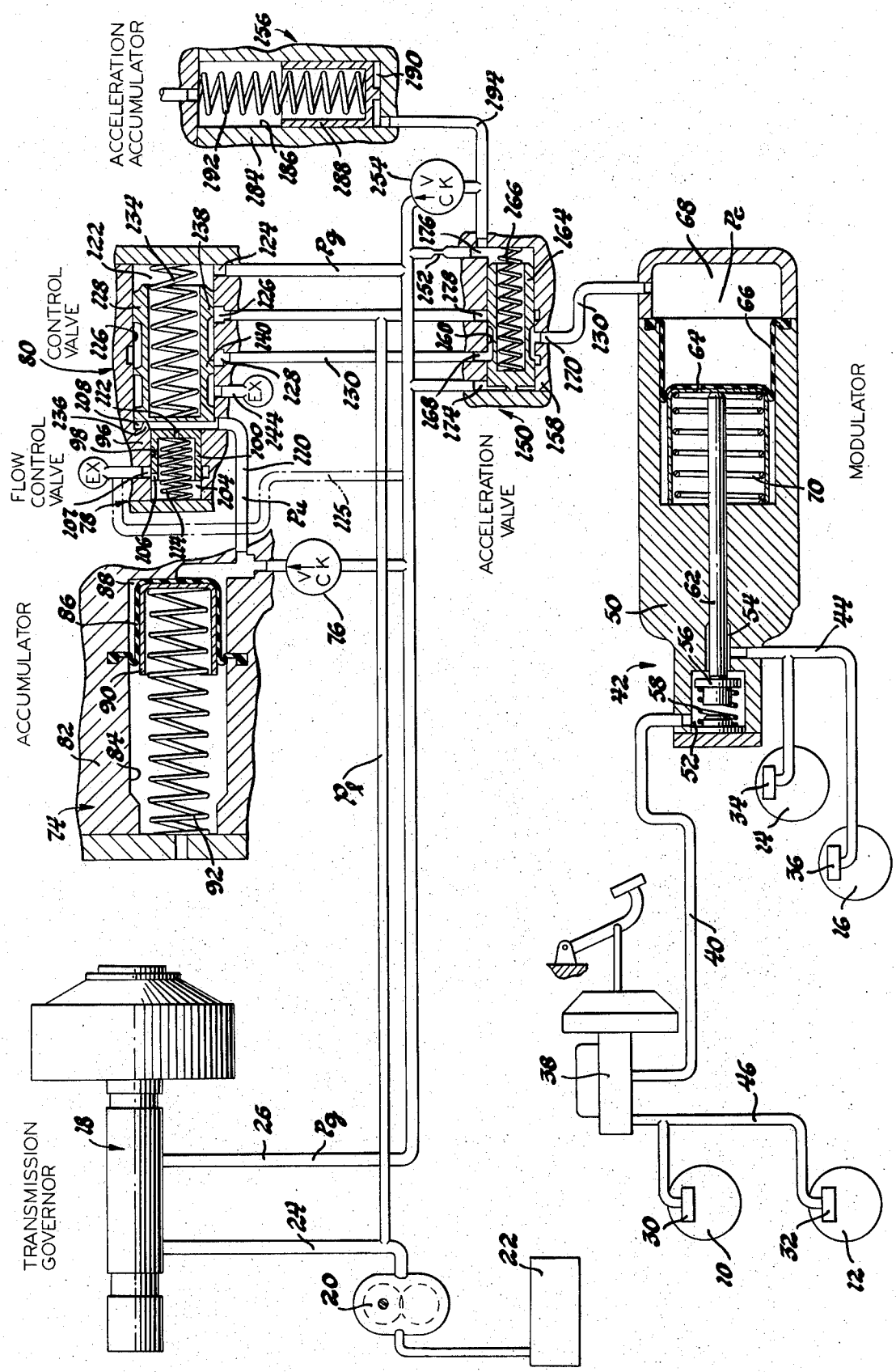

3,810,682

ANTI-LOCK BRAKE SYSTEM

The invention relates to an anti-lock brake system and more particularly to a hydraulic anti-lock brake system utilizing the fluid pressure output of an automatic transmission governor as the sole wheel condition input signal.

It is well known that the brake torque which can be supported by tire-to-road friction peaks at a certain wheel slip ratio and that this brake torque sustaining capacity decreases as the wheel slip ratio increases from the peak value. It has therefore been found desirable to cyclically release and reapply the brake pressure and accordingly the brake torque in accordance with conditions existing at the tire-to-road interface so that the wheel is not permitted to be decelerated beyond a rate which would result in such an increase in wheel slip so as to substantially lessen the retarding force or torque exerted between the tire and the road surface.

During the brake release mode of the anti-lock cycle, the wheel accelerates at a rate which is in part a function of the friction coefficient of the road surface. The wheels will, of course, accelerate faster on a high coefficient surface than on a low friction coefficient surface.

Brake pressure cycling devices, and particularly hydraulically operated systems which depend upon switching of oil flow and pressure, have inherent time delays in sensing and reacting to the various control signals involved. Since anti-lock control of the brakes is most often called for on low coefficient surfaces such as icy or wet pavement, anti-lock systems typically have designed-in compensation for the inherent time lag in reacting to the wheel acceleration rates commonly encountered on such surfaces.

When the anti-lock system operates on a high coefficient surface, the more rapid recovery of the wheel speed subsequent to brake pressure release makes it desirable to anticipate the impending approach of wheel speed to the vehicle speed and to hasten initiation of the brake reapply mode of the cycle so that the inherent time lag does not result in the wheel dwelling at vehicle speed and accordingly sacrificing stopping distance.

The present invention features an acceleration sensing circuit which hastens the reapplication of brake pressure in response to a predetermined wheel acceleration rate so as to compensate for the inherent time lag of the various components of the hydraulic anti-lock circuit.

The present invention provides an anti-lock control system consisting wholly of hydraulically controlled and operated components and utilizing the transmission governor as a wheel velocity and acceleration sensor. The transmission governor receives fluid from the transmission pump and provides fluid at a pressure proportional to the average rear wheel speed and pressure rate of change proportional to the wheel acceleration or deceleration. This governor output fluid at wheel speed pressure is communicated to an accumulator through a check valve. Fluid is discharged from the accumulator through a flow control valve. The flow control valve discharges fluid at a maximum rate providing a pressure rate of change in the accumulator somewhat exceeding the pressure rate of change of the governor pressure during vehicle deceleration at the maximum achievable rate without excessive wheel slip. When brake pressure causes the rear wheels to decelerate at a rate causing the wheel speed proportional governor pressure to fall faster than the accumulator pressure, the check valve communicating the governor to the accumulator is closed and a pressure differential results between the governor pressure and the accumulator pressure. The pressure differential between the accumulator and the governor pressure indicates existence of excessive wheel slip and is applied across a control valve which is shifted by the pressure differential. Shifting of the control valve exhausts the support pressure from the control chamber of a conventional brake pressure modulator to initiate the brake pressure release. A period of wheel acceleration follows the brake pressure release and during the resulting wheel speed recovery, flow from the governor recharges the accumulator, thus ending the pressure differential between the wheel speed proportional governor pressure and the accumulator pressure. Termination of this pressure differential allows the control valve to return to the normal position wherein support pressure is recommunicated to the control chambers of the brake pressure modulator to reapply the wheel brakes. This cycle of release and reapply is repeated until the vehicle is brought to a stop or the excessive brake application is relieved.

An acceleration sensing circuit is provided which senses wheel speed recovery permitted by the brake release and channels fluid directly from the transmission pump to the modulator to initiate the brake reapplication even before the control valve is restored to its normal position by elimination of the pressure differential.

The acceleration sensing circuit includes an acceleration valve interposed fluidly intermediate the control valve and the control chamber of the modulator. The acceleration valve has a spool which normally permits communication between the control valve and the control chamber of the modulator. The wheel speed pressure is communicated directly to one end of the acceleration valve spool and to the other end thereof through an orifice. The end of the valve spool communicated to the orifice is also communicated to an accumulator which stores a volume of fluid communicated thereto through the orifice during wheel acceleration. The orifice is sized to restrict flow to the accumulator and thereby cause a pressure differential across the acceleration valve spool which will shift the valve spool from its normal position when the wheel acceleration exceeds a predetermined level. Shifting of the acceleration valve spool communicates the transmission pump directly to the control chamber of the modulator so as to initiate the brake reapply mode of the anti-lock cycle, even before the control valve has returned to the normal position.

The drawing is a schematic illustration of a vehicle brake system embodying the invention and having parts broken away and in section.

With reference to the drawing, the motor vehicle includes a pair of front wheels 10 and 12 and a pair of rear wheels 14 and 16 which are connected in a conventional manner to the output shaft of an automatic transmission. The transmission includes a conventional transmission governor, indicated generally at 18, connected to the output shaft so as to be driven at the average speed of the rear wheels 14 and 16. The transmission governor 18 receives pressure fluid, hereinafter referred to as Pl, from transmission pump 20 and reservoir 22 via conduit 24. The governor 18 provides in conduit 26 a fluid pressure signal, hereinafter referred to as Pg, which is proportional to the average speed of the rear wheels 14 and 16. The governor responds to wheel velocity increases and decreases by either supplying fluid to conduit 26 or draining fluid from conduit 26 at a flow rate sufficient to provide a pressure rate or change in the conduit 26 which is proportional to the rate of wheel acceleration or deceleration.

The brake system of the vehicle includes conventional wheel brakes 30 and 32 respectively associated with the front wheels 10 and 12, and connected to the master cylinder 38 by conduit 46. Conventional wheels brakes 34 and 36 associated with the rear wheel 14 and 16 are connected to the master cylinder 38 by conduit 40, a conventional brake pressure modulator indicated generally at 42, and a conduit 44.

Brake pressure modulator 42 includes a housing 50 forming a valve chamber 52 connected to conduit 40 and an outlet chamber 54 connected to conduit 44. A modulator valve 56 is located in valve chamber 52 and is biased by spring 58 into closure of outlet chamber 54. A plunger 62 is sealingly slidable in the housing 50 and has an end forming a movable wall of the outlet chamber 54. A cup 64 engages the other end of the plunger 62 and supports a diaphragm 66 defining a control chamber 68. A modulator control or support pressure, hereinafter referred to as Pc, within control chamber 68 acts upon diaphragm 66 and through cup 64 to urge plunger 62 to its leftwardmost position of the drawing wherein it engages and holds modulator valve 56 unseated against the bias of spring 58. When Pc in chamber 68 is decreased, the combined effort of a spring 70 acting on cup 64 and the brake pressure within outlet chamber 54 acting on the end of the plunger 62 will move the plunger 62 rightwardly, thereby allowing spring 58 to seat the modulator valve 56 and interrupt the communication of brake pressure from master cylinder 38 to the rear wheel brakes 34 and 36. A further decrease in Pc permits further rightward movement of plunger 62 and a consequent reduction of brake pressure in outlet chamber 54 and conduit 44 to relieve the brake pressure at the rear wheel brakes 34 and 36. An increase in Pc will move plunger 62 leftwardly to increase pressure in the outlet chamber 54 and then unseat modulator valve 56 to restore free fluid communication between the master cylinder 38 and the rear wheel brakes 34 and 36. Thus it is seen that a conventional brake pressure modulator 42 is provided which overrides operator control of the rear wheel brakes and provides a brake pressure at the wheel brake which is a function of the modulator control pressure Pc communicated to the control chamber 68.

An accumulator 74 includes a housing 82 having a bore 84. A diaphragm 86 has its periphery engaged in the housing 82 and forms therewith an accumulator chamber 88. A piston cup 90 supports the central portion of the diaphragm 86 and is biased to the rightward position of the drawing by a spring 92. The wheel speed pressure signal Pg from the governor 18 is communicated to chamber 88 of the accumulator 74 by Pg conduit 26 and a check valve 76 and moves the diaphragm 86 of accumulator 74 leftwardly to store in the accumulator a volume of fluid at a pressure proportional to the average rear wheel speed.

Fluid pressure in the accumulator 88, hereinafter referred to as Pu, is exhausted therefrom through a flow control valve 78. The flow control valve 78 includes a housing 96 having a bore 98 in which a valve element 100 is slidable. Valve element 100 defines a chamber 104 and has at its end a V-shaped notch 106 which selectively communicates the chamber 1o4 with an exhaust port 107 in the housing 96. The rightward end of valve element 100 forms with housing 96 a chamber 108 and is communicated to the accumulator chamber 88 by a conduit 110. The valve element 100 has an orifice 112 therethrough, which connects the chamber 104 with the chamber 108. A spring 114 urges the valve element 100 rightwardly. Pressurized fluid from accumulator chamber 88 in chamber 108 flows at a restricted rate through the orifice 112. When the pressure Pu in chamber 108 is increased, the pressure in chamber 104 will lag behind the chamber 108 pressure due to the restricted flow through the orifice 112 and as a consequence the valve element 100 will be moved leftwardly against the bias of spring 114 by the pressure differential. This leftward movement restricts fluid flow from chamber 104 to the exhaust port 107 through the V-shaped notch 106 so as to maintain a constant flow of fluid to exhaust port 107 regardless of the increased pressure differential between the chamber 104 and exhaust port 107. When the pressure Pu in chamber 108 decreases as the accumulator 74 is discharged during wheel deceleration the pressure differential across orifice 112 decreases allowing spring 114 to move valve element 100 rightwardly to increase the communication of fluid through the V-shaped notch 106 to the exhaust port 107. In this fashion the flow control valve 78 operates to exhaust fluid from the accumulator 74 at a predetermined maximum rate.

It will be apparent that whenever the vehicle is being accelerated, driven at a constant speed or decelerated at a rate causing a pressure rate of decrease of Pg not greater than the pressure rate of decrease through the flow control valve 78, Pu will equal Pg and the governor will provide fluid through conduit 26 to make-up the quantity of fluid discharged through the flow control valve 78. When the vehicle wheels decelerate at a rate causing Pg to decrease faster than the decrease of pressure Pu in accumulator chamber 88 by virtue of the flow through the flow control valve 78, the check valve 76 will close.

Since the flow control valve 78 passes a constant flow of fluid regardless of the pressure differential between Pu in chamber 108 and the exhaust port 107, the exhaust port may be connected directly to the transmission reservoir 22 as shown in the drawing or may be connected to Pg conduit 26 by a phantom line indicated conduit 115 so as to lessen the load on the transmission pump 20.

The flow rate of the flow control valve 78 is selected to discharge fluid from the accumulator at a maximum rate providing a pressure rate of change in the accumulator somewhat exceeding the pressure rate of change of the governor pressure during vehicle deceleration at the maximum achievable rate experienced during braking on the highest encountered road friction coefficient without attaining wheel slip in excess of that which provides peak brake torque sustaining capability. Thus it is seen that when excessive brake torque causes Pg to decrease at a rate which Pu cannot follow through the flow control valve 78, Pu becomes a reference pressure which decreases gradually to simulate the pressure rate of change of the governor pressure during vehicle deceleration at the maximum achievable rate. Thus the pressure differential between Pu and Pg is a function of the velocity differential between the simulated velocity and the actual wheel velocity then existing. This pressure differential operates the control valve 80.

The control valve 80 includes a bore 116 in the housing 96. A valve spool 118 is slidable in bore 116 and communicates at its leftward end with the chamber 108. The rightward end of valve spool 118 forms a chamber 122 in cooperation with the housing 96. Pg conduit 26 is communicated to the chamber 122 by an inlet port 124. Housing 96 also has a port 126 receiving Pl from the pump 20 via conduit 24, and a port 128 connected by a conduit 130 to the acceleration valve 150 as will be described hereinafter. It is sufficient for present purposes to note that the acceleration valve 150 normally connects port 128 with the control chamber 68 of the modulator 42. Spring 134 acts between housing 96 and the rightward end of spool 118 urging spool 118 leftwardly to a normal position engaging a stop 136 of housing 96. In this position lands 138 and 140 of the spool 118 communicate Pl at port 126 to the port 128. Thus control chamber 68 of the modulator is normally filled with fluid at pressure Pl from the pump 20.

When, as discussed hereinbefore, the vehicle wheels decelerate at a rate causing Pg to decrease faster than Pu, the pressure Pu urges spool 118 rightwardly while the pressure Pg and the spring 134 urge the spool leftwardly. Upon a predetermined differential between Pu and Pg the spring 134 is overcome and the valve spool 118 is moved rightwardly into engagement of the housing 96. In this position the land 140 blocks communication between Pl at port 126 and the port 128 and at the same time opens communication of the port 128 to an exhaust port 144. Consequently, Pc in modulator control chamber 68 is exhausted to the reservoir 22 through the exhaust port 144. Decrease in pressure Pc in the modulator control chamber 68 initiates release of the rear wheel brakes 14 and 16 as described hereinbefore.

The release of brake pressure permits the rear wheels 14 and 16 to begin accelerating. Wheel acceleration causes the transmission governor 18 to increase the pressure Pg. As the increasing Pg approaches the magnitude of Pu, the combined force of Pg and spring 134 moves valve spool 118 leftwardly to its position of FIG. 1 wherein the Pl inlet port 126 is again communicated to the outlet port 128 and thence to the Pc chamber 68 of the modulator to initiate reapplication of the brake pressure.

An acceleration sensing circuit is provided which senses the acceleration rate of the rear wheels during the brake release mode and under certain conditions initiates the brake apply mode of the anti-lock cycle even before the governor pressure Pg is sufficient to return the control valve spool 118 to its normal position of FIG. 1. When the wheels are accelerating at a rate in excess of a predetermined level, for example 3 to 6 g's, it is desirable to hasten the reintroduction of pressure to the control chamber 68 of the modulator so as to compensate for the inherent time lag in increasing the brake pressure. The acceleration switching circuit includes an acceleration valve 150, orifice 152, check valve 154 and acceleration accumulator 156.

Acceleration valve 150 includes a housing 158 having a bore 160 therein. A valve spool 164 is slidable in bore 160 and is biased by spring 166 to a normal position engaging housing 158 as shown in FIG. 1. The acceleration valve 150 is interposed in conduit 130 and has ports 168 and 170 communicating with conduit 130. When in the normal position of FIG. 1, the valve spool 164 communicates fluid through conduit 130 between the control valve port 128 and the modulator control chamber 68. Pg in conduit 26 is communicated to the leftward end of spool 164 through port 174 and to the rightward end of the spool 164 through orifice 152 and port 176. An inlet port 178 in housing 158 is connected to transmission pump 20 by conduit 24.

The acceleration accumulator 156 includes a housing 184 having a bore 186 in which a piston 188 is slidable. The piston 188 forms an accumulator chamber 190 with the housing 184. Spring 192 acts between the housing 184 and piston 188 and urges the piston 188 to rest position engaging the housing 184 as shown in FIG. 1. Accumulator chamber 190 is communicated to port 176 of the acceleration valve 150 by a conduit 194. The check valve 154 is connected between Pg conduit 26 and conduit 194 in parallel flow relationship with the orifice 152.

As the rear vehicle wheels 14 and 16 accelerate subsequent to a decrease in the brake pressure, the transmission governor provides an increasing Pg. As Pg increases, fluid is communicated through the orifice 152 and is stored in the acceleration accumulator 156 as the piston 188 is moved against the bias of accumulator spring 192. If Pg is increasing at a rate in excess of a predetermined level, the orifice 152 restricts flow to the accumulator 156 and the pressure Pg acting on the leftward end of acceleration valve spool 164 exceeds the pressure acting on the rightward end thereof. At a predetermined pressure differential the spring 166 is overcome and spool 164 is moved rightwardly of its position shown in the drawing so that communication is blocked between the port 168 and the port 170 and communication of Pl at port 178 opened to the port 170 and thus communicated to the control chamber 68 of the modulator. During wheel deceleration and consequent decrease in Pg, fluid is discharged from the acceleration accumulator 156 via the check valve 154. Accordingly, spring 166 moves the acceleration valve spool 164 leftwardly to its normal position of FIG. 1 and the modulator control chamber 68 is again communicated to the outlet port 128 of the control valve.

Thus it is seen that reintroduction of pressure to the control chamber 68 of the modulator is hastened when the acceleration of the vehicle wheels subsequent to brake release exceeds a predetermined level so as to compensate for the inherent time lag in the response of the control valve 80 and modulator 42.

We claim:

1. An anti-lock brake system comprising, a brake pressure modulating means effective to modulate brake pressure communicated to a wheel brake as a function of a control pressure communicated to the brake pressure modulating means, means providing fluid at a pressure proportional to the speed of the wheel and a pressure rate of change proportional to wheel acceleration and deceleration, hydraulic means providing a reference pressure during periods of excessive wheel slip, hydraulic means responsive to the differential between the wheel speed proportional pressure and the reference pressure to vary the control pressure communicated to the brake pressure modulator to cause release of the brake pressure when the pressure differential exceeds a predetermined level and to increase the brake pressure when the differential falls below the predetermined level, and hydraulic means responsive to a predetermined pressure rate of change of the wheel speed proportional pressure for varying the control pressure in the brake pressure modulating means to initiate brake pressure reapplication irrespective of the differential between the wheel speed proportional pressure and the reference pressure.

2. In a vehicle anti-lock brake system having brake pressure modulating means acting to cyclically release and reapply the brake pressure as a function of a control pressure communicated thereto and hydraulic wheel condition sensing and control logic means for providing the control pressure and including means providing fluid at a pressure proportional to the speed of the braked wheel and at a pressure rate of change to the acceleration and deceleration of the braked wheel, and means for hastening reapplication of brake pressure when wheel acceleration exceeds a predetermined level so as to compensate for inherent time delays in the anti-lock system, said means comprising, an accumulator, orifice means communicating wheel speed proportional pressure fluid to the accumulator to charge the accumulator during wheel acceleration and provide a differential between the accumulator pressure and wheel speed proportional pressure when the wheel acceleration causes a flow rate in excess of the flow threshold of the orifice, and valve means operable by a predetermined differential between the wheel speed proportional pressure and the accumulator pressure to vary the control pressure to the brake pressure modulating means to increase the brake pressure irrespective of the control pressure communicated thereto by the hydraulic wheel condition sensing and control logic means.

3. An anti-lock brake system comprising, a brake pressure modulating means operable to selectively release and reapply the brake pressure to a wheel brake, governor means driven at wheel speed and providing fluid at a pressure proportional to wheel speed and a pressure rate of change proportional to the wheel acceleration and deceleration, a first accumulator, check valve means communicating wheel speed proportional pressure fluid to the first accumulator to charge the first accumulator, flow control valve means discharging pressure fluid from the first accumulator at a maximum rate and providing a differential between the wheel speed proportional pressure and the first accumulator pressure during wheel deceleration causing a pressure rate of change through the governor means exceeding the pressure rate of change through the flow control valve, control valve means operable by the differential between wheel speed proportional and first accumulator pressure to operate the brake pressure modulating means to release the brake pressure when the differential exceeds a predetermined level and to increase the brake pressure when increasing wheel speed subsequent to brake pressure release causes the differential pressure to fall below a predetermined level, a second accumulator, orifice means communicating wheel speed proportional pressure fluid to the second accumulator to charge the second accumulator during wheel acceleration and provide a differential between the second accumulator pressure and wheel speed proportional pressure when the wheel acceleration causes a flow rate in excess of the flow threshold of the orifice, and valve means operable by a predetermined differential between the wheel speed proportional pressure and the second accumulator pressure to operate the brake pressure modulating means to increase the brake pressure irrespective of the differential between the wheel speed proportional pressure and the first accumulator pressure.

* * * * *